(12) United States Patent
Sarkar et al.

(10) Patent No.: US 8,943,099 B1
(45) Date of Patent: Jan. 27, 2015

(54) DETERMINING CODOMAIN RELATIONSHIP MEASURES

(71) Applicant: Google Inc., Mountain View, CA (US)

(72) Inventors: Prateek Sarkar, Sunnyvale, CA (US);
Arcot J. Preetham, San Jose, CA (US);
Hyung-Jin Kim, Sunnyvale, CA (US);
Gabriel Wolosin, San Mateo, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 13/774,448

(22) Filed: Feb. 22, 2013

Related U.S. Application Data

(60) Provisional application No. 61/648,858, filed on May 18, 2012.

(51) Int. Cl.
*G06F 17/30* (2006.01)

(52) U.S. Cl.
CPC ............................. *G06F 17/3053* (2013.01)
USPC ............ 707/791; 707/802; 707/822; 707/828

(58) Field of Classification Search
CPC ..................................................... G06F 17/30
USPC ................................................... 707/600–899
See application file for complete search history.

(56) References Cited

U.S. PATENT DOCUMENTS

| 2002/0099566 A1* | 7/2002 | Kobayashi ........................ 705/1 |
| 2007/0103551 A1 | 5/2007 | Kim et al. |

* cited by examiner

*Primary Examiner* — Isaac M Woo
(74) *Attorney, Agent, or Firm* — Fish & Richardson P.C.

(57) ABSTRACT

Methods, and systems, including computer programs encoded on computer-readable mediums, including a method for determining codomain relationship measures between domains pairs. The method includes accessing domain data specifying first and second domains; for each first domain: determining a total number of image links on web pages on the first domain, each image link being a link to an image on a second domain; identifying second domains hosting images to which image links on web pages on the first domain link; for each second domain: determining a number of image links from web pages on the first domain linking to images on the second domain; determining a codomain relationship measure for the first and second domain based on the number of image links from web pages on the first domain linking to images on the second domain and the total number of image links on web pages on the first domain.

20 Claims, 5 Drawing Sheets

DETERMINING CODOMAIN RELATIONSHIP MEASURES

CROSS-REFERENCE TO RELATED APPLICATIONS

This application claims priority under 35 U.S.C. §119(e) to U.S. Provisional Application Ser. No. 61/648,858 titled "Determining Codomain Relationship Measures" filed May 18, 2012, the disclosure of which is incorporated herein by reference in its entirety.

BACKGROUND

This specification relates to information retrieval.

The Internet enables access to a wide variety of resources, such as images, video or audio files, web pages for particular subjects, book articles, or news articles. A search system can identify resources in response to a search query that includes one or more search terms or phrases. The search system ranks the identified resources based, at least in part, on their relevance to the search query. The search results are typically ordered according to the rank.

A search result can, for example, include a link to an identified resource, a title of the identified resource, e.g., web page title, a snippet of text from the identified resource, a representation of the identified resource, e.g., a thumbnail of an image, the uniform resource locator (URL) of the identified resource, or any combination thereof.

For a search result including a reference to an image, e.g., an image search result, there are often numerous web pages, e.g., landing pages, to which the search result can reference and through which the image can be accessed, e.g., viewed by a user on a user device. For example, the search system may identify a particular painting as being responsive to a search query and generate a search result for the painting. Given that the painting is very well known, images of the painting may be accessible from numerous web pages. For example, each of the web pages may link to an image of the painting hosted on another web page.

SUMMARY

In general, one aspect of the subject matter described in this specification can be implemented in methods that include accessing domain data specifying first domains that are used to host web pages and second domains that are used to host images linked to by the web pages; for each of the first domains: determining a total number of image links on web pages hosted on the first domain, where each image link is a link to an image hosted on a second domain; identifying second domains hosting images to which image links on web pages hosted on the first domain link; for each of the second domains: determining a number of image links from web pages hosted on the first domain linking to images hosted on the second domain; determining, by one or more data processors, a codomain relationship measure for the first domain and the second domain specifying a measure of relatedness between the first domain and the second domain based at least in part on the number of image links from web pages hosted on the first domain linking to images hosted on the second domain and the total number of image links on web pages hosted on the first domain. Other embodiments of this aspect include corresponding systems, apparatus, and computer programs, configured to perform the actions of the methods, encoded on computer storage devices.

Particular implementations of the subject matter described in this specification can be implemented to realize one or more of the following advantages. A web page linking to an image to be referenced by a search result can be selected from among multiple web pages linking to the image based on relatedness between the domains hosting the web pages and the domains hosting the image, "codomain relationship measures." Selecting web pages based on respective codomain relationship measures can, for example, reduce the likelihood of selecting a web page of low authority or quality to reference in the search result.

Low authority or low quality web pages likely have low codomain relationship measures because such web pages often "hotlink" to many popular images hosted on many different domains to increase user traffic without shouldering the burden of actually hosting the images. In contrast, highly authoritative web pages, for example, tend to serve images off their own domains rather than hot-linking to images hosted on others' domains, provide original content, or both.

As low authority web pages often link to images hosted on many different domains, the relatedness between the low authority web pages and any one image hosting domain will likely be low, which results in low codomain relationship measures for the low authority web pages. Thus highly authoritative web pages hosting images on their domain or on related domains, e.g., as indicated by high codomain relationship measures, and bearing the burden and expense of hosting such images, will be preferred to reference in search results over low authority web pages.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

System Overview

Figure 1:
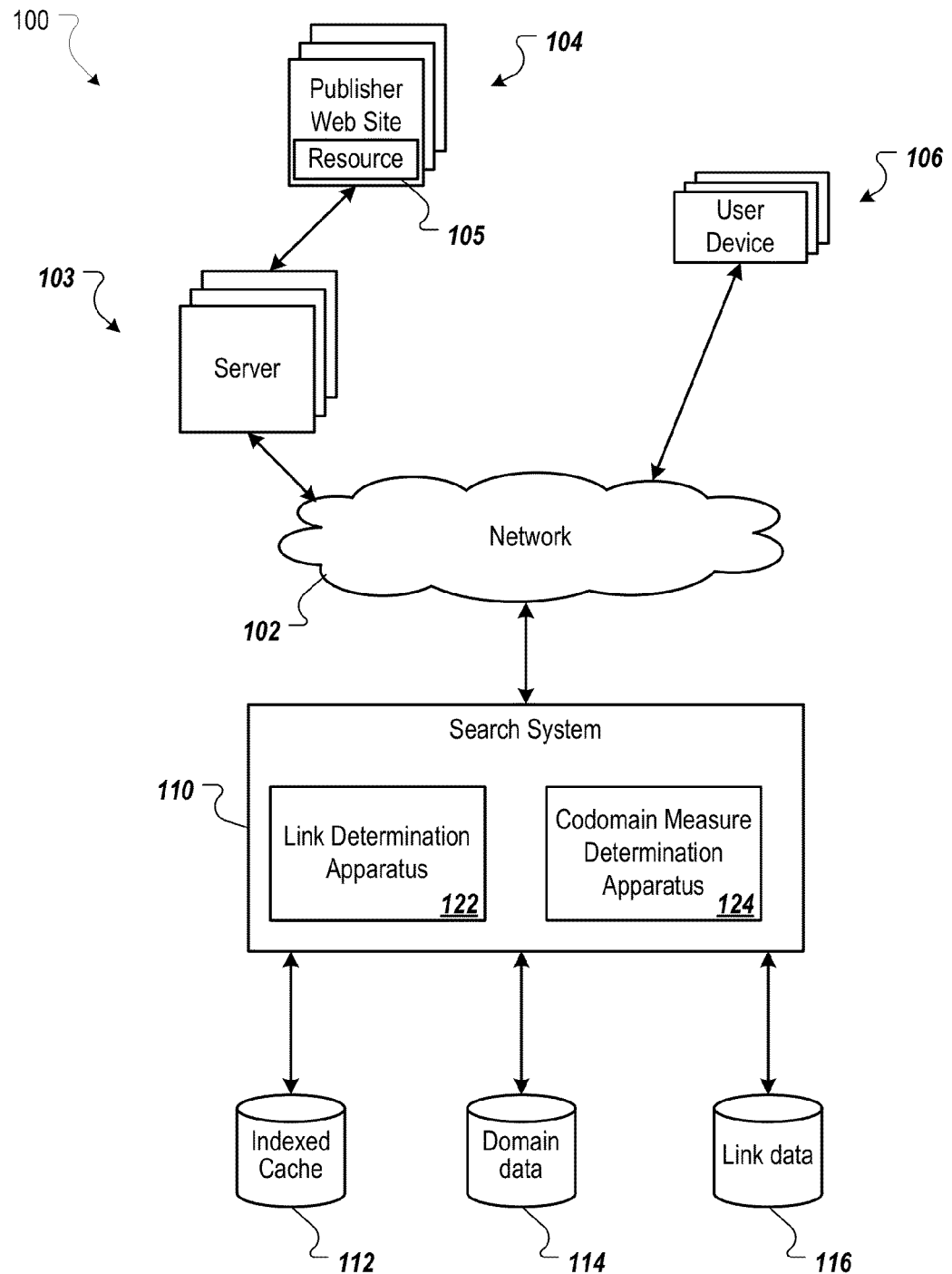
FIG. 1 is a block diagram of an example environment in which a search system can be implemented and provide search services.

This specification generally relates to determining codomain relationship measures between domain pairs of first and second domains, where the first domain is used for hosting web pages, and the second domain is used for hosting images that are linked to by web pages hosted on the first domain. The designation of first domain and second domain can be reversed for any two domains, e.g., both domains host pages that link to images hosted by the other domain. Thus, the terms "first domain" and "second domain" do not mean that a particular domain does not host images or web pages.

The codomain relationship measures can be used, for example, to select a particular web page, e.g., landing page, for an image to be referenced in a search result. For example, a search query is submitted to a search system. The search system identifies an image as responsive to the search query. The image is available through multiple web pages which link to the image, e.g., the web pages include scripts or links that retrieve the image from other web pages and cause the image to be displayed when the web page is rendered on a user device. The codomain relationship measures associated with the multiple web pages can be used to select one of the web pages to reference in the search result.

A codomain relationship measure is a measure of the relatedness between the first domain of the web page and the second domain of the referenced image. The codomain relationship measure can be based on, for example, a ratio of the number of image links from web pages hosted on the first domain and linking to images hosted on the second domain to the total number of image links on web pages hosted on the first domain. For example, web pages on a first domain R may link to a total of twenty-five images; five images hosted on second domain A, twelve images hosted on second domain B and eight images hosted on second domain C. As such, the codomain relationship measures for the first domain R and second domains A, B and C are, respectively, 5/25=0.2; 12/25=0.48 and 8/25=0.32. In another example, web pages hosted on a first domain S may link to a total of eighty images, all hosted on second domain D. As such, the codomain relationship measure for the first domain S and second domain D is 1.0.

Thus, for the selection of a web page hosted on a first domain to reference in a search result for an image hosted on a second domain, a web page from a first and second codomain pair with a high codomain relationship measure is given preference over a web page from a first and second domain pair with a low codomain relationship measure. A low codomain relationship measure may indicate a web domain hosts web pages of low authority. For example, an image is identified for reference in a search result, e.g., the image or the subject matter of the image is determined to be relevant to a search query. The image is hosted on the second domain A and linked to by a web page hosted on the first domain R, and the image is also hosted on the second domain D and linked to by a web page hosted on the first domain S. As the codomain relationship measure for the second domain D and first domain S is higher than the codomain relationship measure for the second domain A and first domain R, the search system will cause the search result to reference the web page hosted by the first domain S as the landing page for the image. Thus a selection of the search result will cause, for example, a user device to render web page hosted on the first domain S, which, in turn, will cause the request and display by a user device of the image hosted on the second domain D.

Thus the codomain relationship measure is, for example, an indicator of the quality or authority of a landing page. Although in the above example, the codomain relationship measure is used to determine which landing page is selected, in some implementations, the codomain relationship measure is used in combination with other indicators of landing page quality to select a landing page, as described below.

Example Operating Environment

FIG. 1 is a block diagram of an example environment 100 in which a search system 110 can be implemented and provide search services. A network 102, such as a local area network, "LAN," wide area network, "WAN," the Internet, or a combination thereof, connects servers 103, publisher web sites 104, user devices 106, and the search system 110. The example environment 100 may include multiple servers 103, publisher web sites 104 and user devices 106.

A publisher web site 104 is a one or more resources 105, e.g., web pages, associated with a domain. A domain is an identification string that defines a realm of administrative autonomy, authority, or control in the Internet. The domain can be used to identify one or more internet protocol (IP) addresses. An IP address is a numerical label assigned to devices, e.g., user devices 106 and servers 103, on the network 102. A domain, for example, is exampledomain.com, which corresponds to IP address X.X.X.X or exampledomain.biz, which corresponds to IP address Y.Y.Y.Y. In some implementations, domain data specifying domains and the publisher web sites 104 and resources 105 associated with those domains are stored in a domain data store 114.

A domain has a suffix that indicates to which top level domain (TLD) it belongs, e.g., ".edu," ".com," ".org" and ".net." A domain can also have subdomains. A subdomain is a part of a larger respective domain. For example, exampledomain.com can have subdomains en.exampledomain.com and mail.exampledomain.com. Further, a subdomain, itself, can have subdomains. Thus a domain can represent a hierarchical structure with the domain at the top level and subdomains at lower levels.

A publisher web site 104 can be hosted by one or more servers 103 or other computing devices connected to the network 102. An example publisher web site 104 includes a collection of web pages formatted in hypertext markup language, "HTML," that contains text, graphic images, multimedia content, and programming elements, such as scripts. In some implementations, a publisher web site 104 is maintained by a publisher, e.g., an entity that manages and/or owns the web site.

A resource 105 is any data that is provided by a publisher web site 104 over the network 102 and associated with a resource address. For example, resources 105 include HTML pages, word processing documents, portable document format, "PDF," documents, images, videos, and feed sources. A resource 105 has an addressable storage location that can be uniquely identified by the resource address, such as a universal resource locator (URL). For example, the URL for a blog, e.g., resource 105, on the domain exampledomain.com is www.exampledomain.com/blog.html.

The resources 105 can include content, such as, text, images, and so on, and may include embedded information, such as meta information, e.g., metadata, and hyperlinks, and/or embedded instructions such as scripts. A resource 105 can reference another resource 105 by use of a resource link ("link"). An example link is a HTML hyperlink that references another resource 105 by the URL of the resource 105, or an Xlink in an extensible markup language (XML) document. For example, web page A hosted on domain A may link to an image on web page B hosted on domain B such that when a user device 106 renders web page A the HTML of web page A, e.g., a script in the HTML, causes the user device 106 to request the image from web page B and display the image with web page A. In some implementations, link data identifying the links between resources 105 are stored in a link data store 116.

For clarity, as used herein, when a resource 105, e.g., a web page or an image, is described as being hosted on a particular domain it means the resource 105 is hosted on the server or servers 103 that have an IP address or addresses identified by or identified as being part of the particular domain.

A user device 106 is an electronic device that is under the control of a user and capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user device 106 to display text, images, videos, music and other information typically located on a web page at a website on the world wide web or a local area network.

To facilitate searching of these resources 105, the search system 110 can identify the resources 105 by crawling the publisher web sites 104 and indexing the resources 105 provided by or available from the publisher web sites 104. The indexed and, optionally, cached copies of the resources 105 can be stored in an indexed cache data store 112.

User devices 106 can submit search queries to the search system 110. The search queries can be submitted to the search system 110 in the form of a search request that includes the search query. In response to the search request, the search system 110 can use data in the indexed cache data store 112 to identify resources 105 that are relevant to the search query. The search system 110 identifies the resources 105 in the form of search results and returns the search results to the user devices 106 in a search results page.

A search result can be data generated by the search system 110 that identifies a resource 105 that satisfies a particular search query, and includes a resource locator for the resource 105. An example search result can include any, or a combination, of a web page title, a snippet of text extracted from a web page, an image or thumbnail of an image, and a URL of a web page that includes the snippet of text and/or the image.

The search results can be ranked, for example, based on scores related to the resources 105 identified by the search results, such as information retrieval, "IR," scores. In some implementations an IR score can be based on a quality of the resource 105 and a relevancy of the resource 105. The ranking of the search results is based, at least in part, on the IR scores.

The user devices 106 receive the search results on search results pages and render the pages for presentation to users. In response to a user selecting a search result at a user device 106, the user device 106 requests the resource 105 identified by the resource locator included in the selected search result. The server 103 hosting a publisher web site 104 associated with the resource 105 receives the request for the resource 105 from the user device 106 and provides the resource 105 to the requesting user device 106.

As described above, in some scenarios, a search result can be an image search result that includes a reference to an image that is accessible from multiple web pages. In some implementations, the link determination apparatus 122 and the codomain measure determination apparatus 124 facilitate the determination of which of the multiple web pages will be the displayed landing page for the image in response to a user selection of the search result, as described below with reference to FIGS. 2A-B.

Codomain Relationship Measure Determination

Figure 2A:
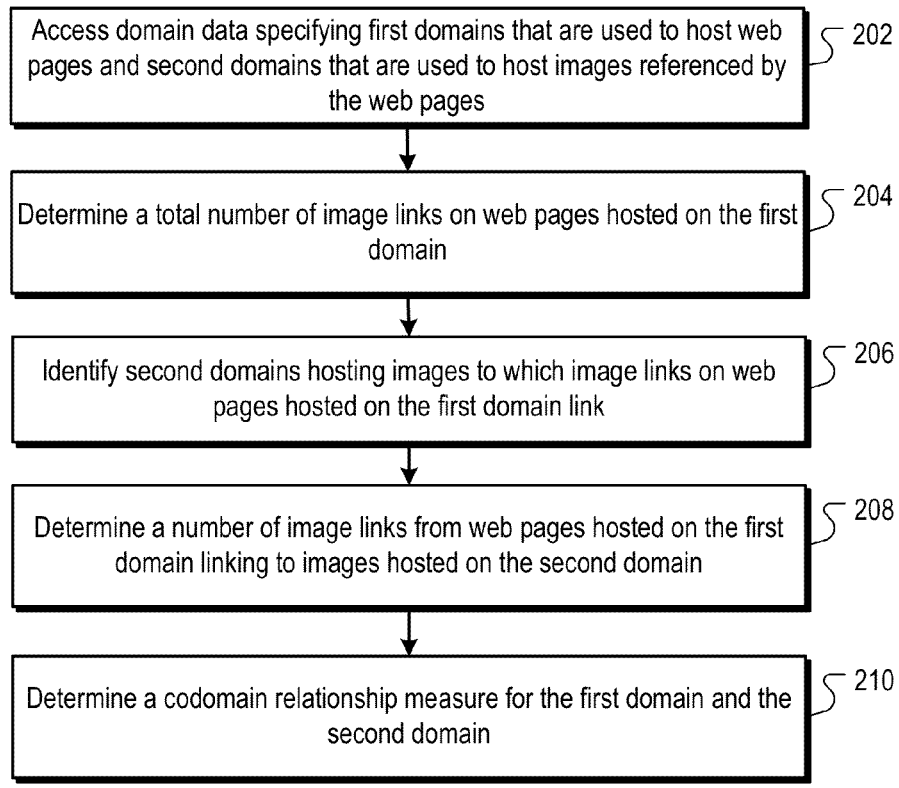
FIG. 2A is a flow diagram of an example process for determining codomain relationship measures.

FIG. 2A is a flow diagram of an example process 200 for determining codomain relationship measures. The process 200 can be implemented in one or more data processing apparatuses in which the search system 110 is implemented. In some implementations, the process 200 is periodically performed in an offline, e.g., preprocessing, stage such that the codomain relationship measures are pre-computed and are not determined in a query-time process in response to the search system 110 receiving a search query. Rather the codomain relationship measures are "looked-up," in a data store where the previously computed codomain relationship measures are stored, in a real-time or near real-time process in response to the search system 110 receiving a search query. However, in some implementations, codomain relationship measures can additionally, or alternatively, be computed in a query-time process with respect to receiving search queries or determining responsive search results.

The process 200 accesses domain data specifying first domains that are used to host web pages and second domains that are used to host images linked to by the web pages (202). In some implementations, the link determination apparatus 122 receives or accesses data specifying a set of first domains hosting web pages, e.g., as identified by an administrator or based on web page popularity, etc. For example, the link determination apparatus 122 accesses the domain data store 114 to identify the first domains.

The process 200, for each of the first domains, determines a total number of image links on web pages hosted on the first domain (204). For example, the link determination apparatus 122, for each of the first domains in the set of first domains, accesses link data from the link data store 116 and determines a total number of image links on web pages hosted on the first domain where each image link is a link to an image hosted on a second domain. In some implementations, the link determination apparatus 122 determines the total number of image links on web pages hosted on the first domain by aggregating the numbers of image links from each web page hosted by the first domain. Further in some implementations, the link determination apparatus 122 determines the total number of image links regardless of, e.g., independent of, which and how many second domains host the images to which the image links link.

In some scenarios, two web pages hosted by the first domain may link to the same image accessible from the same web page hosted on the second domain. In such scenarios, the link determination apparatus 122 can count each image link as a separate image link in its determination of the total number of image links. Alternatively, the link determination apparatus 122 can treat the two image links as the same image link in its determination of the total number of image links.

Figure 2B:
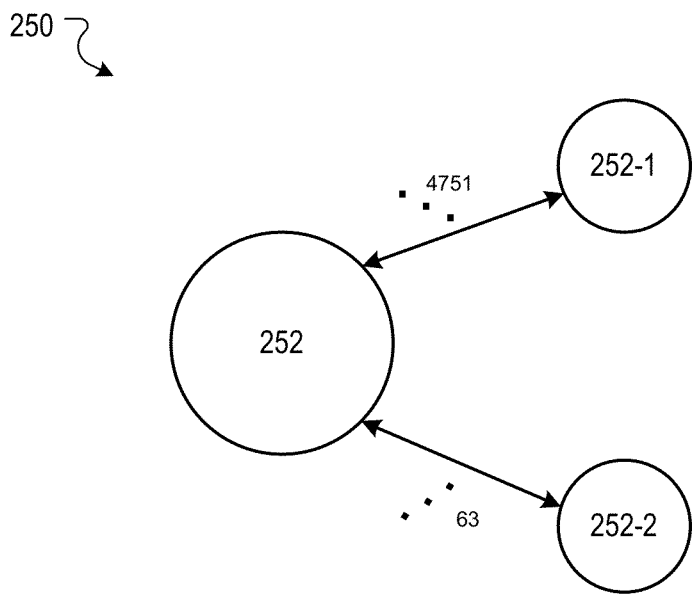
FIG. 2B is a block diagram of example image links between first and second domains.
Figure 2B:
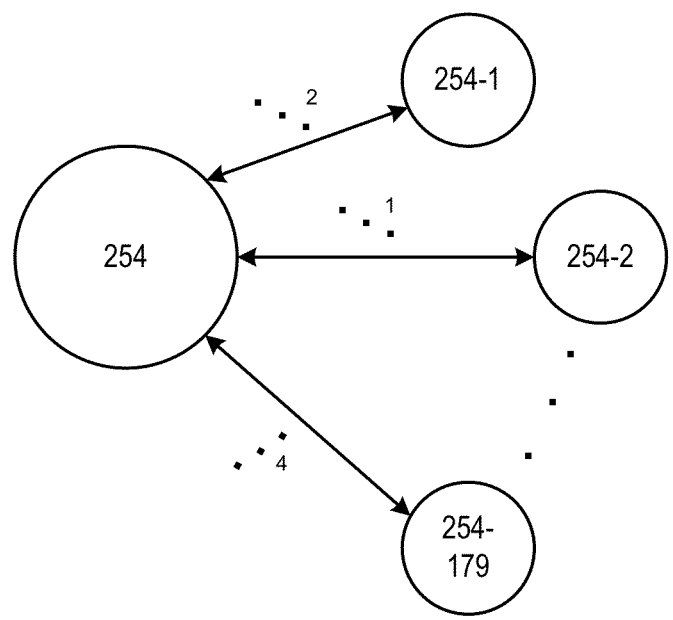

The determination of the total number of image links is described with reference to FIG. 2B, which is a block diagram 250 of example image links between first and second domains. The first domain 252 hosts web pages that have image links to the second domain 252-1 and the second domain 252-2. More particularly, the first domain 252 hosts web pages that have 4,751 image links to images hosted by the second domain 252-1, and 63 image links to images hosted by the second domain 252-2. Thus, for the first domain 252, the link determination apparatus 122 determines that the total number of image links on web pages hosted on the first domain 252 is 4,814=4,751+63.

The first domain 254 hosts web pages that have image links to 179 different second domains, second domains 254-1 through 254-179. More particularly, the first domain 254 hosts web pages that have 537 image links to images hosted by the second domains 254-1 through 254-179. Of these 179 second domains, the second domain 254-179 has the most image links from the first domain 254, e.g., four image links, and is the only second domain with four image links from the first domain 254. Thus, for the first domain 254, the link determination apparatus 122 determines that the total number of image links on web pages hosted on the first domain 254 is 537. More generally, a first domain can host any number of web pages with any number of image links to any number of images hosted by any number of second domains.

The process 200, for each of the first domains, identifies second domains hosting images to which image links on web pages hosted on the first domain link (206). For example, the link determination apparatus 122, for each of the first domains in the set of first domains, identifies second domains hosting images to which image links on web pages hosted on the first domain link. In some implementations, the link determination apparatus 122 identifies the second domains hosting images to which image links on web pages hosted on the first domain link by accessing the domain and link data stores 114, 116, and processing, e.g., parsing, the accessed data based on associations between the second domains and the first domain. With reference to the first domain 252, the link determination apparatus 122 determines that the first domain 252 hosts web pages that include image links to the second domain 252-1 and the second domain 252-2. Similarly, with reference to the first domain 254, the link determination apparatus 122 determines that the first domain 254 hosts web pages that include image links to the second domains 254-1 through 254-179.

The process 200, for each of the second domains, determines a number of image links from web pages hosted on the first domain linking to images hosted on the second domain (208). For example, the link determination apparatus 122, for each of the second domains identified in process 206, determines a number of image links from web pages hosted on the first domain linking to images hosted on the second domain.

In some implementations, the link determination apparatus 122 determines the number of image links by accessing the domain and link data stores 114, 116, identifying the image links between web pages hosted on the first domain linking to images hosted on the second domain, and aggregating the identified image links. For example, the first domain 252 can host eight web pages, three of which have image links linking to images hosted on the second domain 252-2. The three web pages, web pages A, B and C, can, for example, have 30, 18 and 15 image links, respectively. The link determination apparatus 122 aggregates the numbers of image links from web page A, B and C to determine the number of image links from web pages hosted on the first domain 252 linking to images hosted on the second domain 252-2 is 63 image links.

A web page may include image links to multiple domains, e.g., web page A may include image links to images on the second domain 252-1. In such situations, the respective image links are counted for the respective codomain relationships, e.g., a web page with image links to multiple domains may be considered for multiple codomain relationships.

In some implementations, the link determination apparatus 122 determines the total number of image links linking to images hosted on the second domain. For example, the link determination apparatus 122 determines the total number of image links from every web page hosted on any domain linking to images hosted on the second domain. Thus, if only two first domains host web pages with links linking to images hosted on the second domain 252-1, and the first domain 252 hosts web pages with 4,751 links to the second domain 252-1 and the other first domain hosts web pages with 257 links to the second domain 252-1, then the link determination apparatus 122 determines the total number of image links linking to images hosted on the second domain is 5,008=4,751+257.

In some implementations, the link determination apparatus 122 determines the total number of image links linking to images hosted on the second domain by accessing the domain and link data stores 114, 116, identifying the relevant image links, and aggregating the identified image links.

The process 200, for each of the second domains, determines a codomain relationship measure for the first domain and the second domain (210). For example, the codomain measure determination apparatus 124 determines the codomain relationship measure for a first domain and a second domain based at least in part on the number of image links from web pages hosted on the first domain linking to images hosted on the second domain, e.g., from the process 208, and the total number of image links on web pages hosted on the first domain, e.g., from the process 204. The codomain relationship measure for the first domain and the second domain specifies a measure of relatedness between the first domain and the second domain.

In some implementations, the codomain relationship measure is a ratio of the number of image links from web pages hosted on the first domain linking to images on the second domain to the total number of image links on web pages hosted on the first domain, and is expressed by Equation (1):

$$CDR(D1,D2) = \#IL(D1,D2)/\#IL(D1) \qquad (1)$$

where:
$\#IL(D1, D2)$ is the number of image links on web pages hosted on the first domain linking to images hosted on the second domain; and
$\#IL(D1)$ is the total number of image links on web pages hosted on the first domain.

In such implementations, the codomain measure determination apparatus 124 determines the ratio of the number of image links from web pages hosted on the first domain linking to images on the second domain to the total number of image links on web pages hosted on the first domain, and sets the codomain relationship measure for this first domain/second domain pair as the determined ratio. For example, for the first domain 252 and the second domain 252-1, the codomain measure determination apparatus 124 determines the codomain relationship measure for this pair of domains is 4751/4814=0.987. In a similar manner, for the first domain 252 and the second domain 252-2, the codomain measure determination apparatus 124 determines the codomain relationship measure for this pair of domains is 63/4814=0.013. Thus the first domain 252 and second domain 252-1 pair have a higher codomain relationship measure than the first domain 252 and second domain 252-2 pair as the first domain 252 and second domain 252-1 pair have more image links than the first domain 252 and second domain 252-2 pair.

In some implementations, the codomain relationship measure is a ratio of the number of image links from web pages hosted on the first domain linking to images on the second domain to the total number of image links linking to images hosted on the second domain, and is expressed by Equation (2):

$$CDR(D1,D2) = \#IL(D1,D2)/\#ILT(D2) \qquad (2)$$

where $\#ILT(D2)$ is the total number of image links linking to images hosted on the second domain.

In such implementations, the codomain measure determination apparatus 124 determines the ratio of the number of image links from web pages hosted on the first domain linking to images on the second domain to the total number of image links, e.g., from every web page hosted on any domain, linking to images hosted on the second domain, and sets the codomain relationship measure for this first domain/second domain pair as the determined ratio. For example, if there are 5008 image links to images hosted on the second domain 252-1 then for the first domain 252 and the second domain 252-1, the codomain measure determination apparatus 124 determines the codomain relationship measure for this pair of domains is 4751/5008=0.949. In a similar manner, if there are 4375 image links to images hosted on the second domain 252-2 then for the first domain 252 and the second domain 252-2, the codomain measure determination apparatus 124 determines the codomain relationship measure for this pair of domains is 63/4375=0.014. Thus the first domain 252 and second domain 252-1 pair have a higher codomain relationship measure than the first domain 252 and second domain 252-2 pair.

In some implementations, the codomain relationship measure can be based on Equation 1, Equation 2 or a combination thereof. Further, in some implementations, the counts, e.g., #IL(D1,D2), #IL(D1), #ILT(D2), used in the examples above may be replaced by weighted aggregates of the counts where the weights are based on a quality or utility of the links, the images, the web pages, the domains, or a combination thereof.

In some implementations, the codomain measure determination apparatus 124 only determines a codomain relationship for a codomain pair, e.g., a unique pairing of a first and a second domain, if the total number of image links from web pages hosted on the first domain satisfies, e.g., exceeds, an image link number threshold. For example, the link determination apparatus 122 determines that the first domain 254 has 537 image links. If, for example, the image link number threshold is 600 image links, e.g., or any other specified threshold such as 100 image links or 1000 image links, then the codomain measure determination apparatus 124 will not determine a codomain relationship measure or measures for the codomain pair or pairs having the first domain 254 as the total number of image links for the first domain 254 does not exceed the image link number threshold. Conversely, if the image link number threshold is 500 image links then the codomain measure determination apparatus 124 will determine a codomain relationship measure or measures for the codomain pair or pairs having the first domain 254 as the total number of image links for the first domain 254 exceeds the image link number threshold.

Only determining codomains relationship measures for codomain pairs with first domains that exceed the image link number threshold can reduce the processing burdens, storage burdens or both on the search system 110 in calculating codomain relationship measures for such codomain pairs for which there is not enough image link information to determine a codomain relationship measure with a desired degree of confidence, e.g., a confidence threshold. Further, as some first domains hosting low authority web pages have only a limited number of image links, the image link number threshold can be used to avoid determining codomains relationship measures for such low authority first domains.

Figure 3:
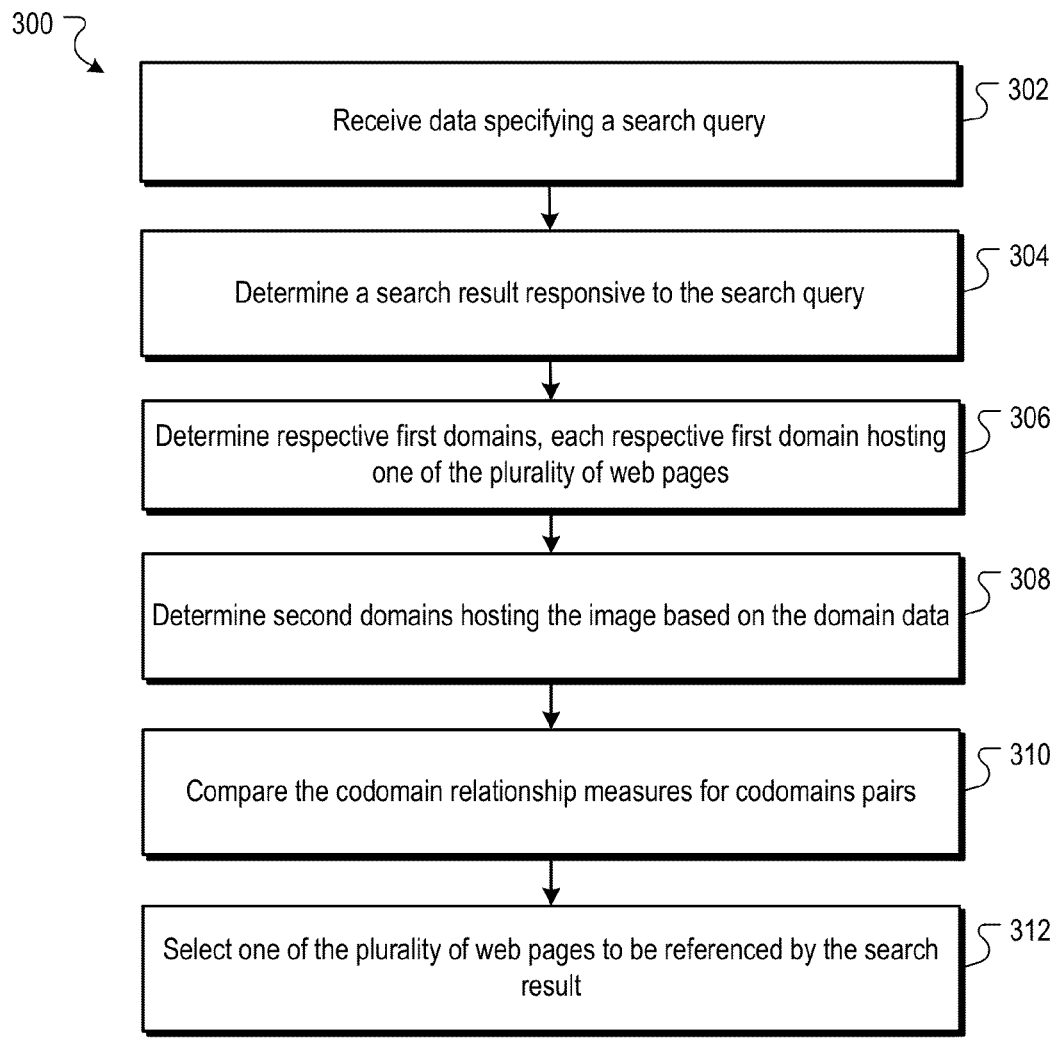
FIG. 3 is a flow diagram of an example process for selecting a web page to be referenced by a search result.

As described above, codomain relationship measures can be used, for example, to select a web page, e.g., a landing page, to be referenced by a search result to provide access to an image responsive to a search query. Such a selection process is described below with reference to FIG. 3, which is a flow diagram of an example process 300 for selecting a web page to be referenced by a search result. As described above, in some implementations, the process 200 can be performed iteratively, during one or more preprocessing stages, whereas the process 300 can be performed in a real-time or near real-time process in response to receiving a search query, as described below.

The process 300 receives data specifying a search query (302). For example, the search system 110 receives a search query from a user device 106. As described above, the search queries can be submitted to the search system 110 in the form of a search request that includes the search query.

The process 300 determines a search result responsive to the search query (304). For example, in response to the receiving the search query, the search system 110 can use data in the indexed cache data store 112 to determine one or more search results, e.g., references to resources 105 that are relevant to the search query.

A search result can identify an image as relevant to the search query and include a reference to the image. For example, the search result can include a thumbnail of an image that is or pertains to subject matter responsive to the search query. In some scenarios, the image, e.g., represented by the thumbnail, is referenced by or otherwise accessible from numerous web pages, e.g., resources 105. For example, the search query "Van Gogh's Starry Night painting" is submitted to the search system 110. The search system 110, in turn, identifies six different web pages from which an image of Starry Night is accessible, e.g., each of the six web pages includes an image link to an image of Starry Night that will be retrieved or otherwise accessed from a second domain hosting the image and displayed on the web page when the web page is rendered on a user device 106. The six web pages can be hosted on the same first domain, different first domains or some combination thereof.

The process 300 determines respective first domains, each respective first domain hosting one of a plurality of web pages (306). For example, the link determination apparatus 122 determines the first domains of the numerous web pages, e.g., the plurality of web pages, identified by the search system 110 from which a relevant image is accessible. In other words, the link determination apparatus 122 determines the first domains hosting the web pages having image links to the image referenced in the search result, e.g., as determined in process 304.

As described above, the web pages may be hosted on the same first domain, different first domains or some combination thereof. For example, one web page having an image link to a relevant image, e.g., a photograph of the Starry Night painting, is hosted on the first domain 252, and another web page having an image link to a relevant image, e.g., a sketch drawing representation of the Starry Night painting, is hosted on the first domain 254. As such, the link determination apparatus identifies the first domains 252 and 254 as respective first domains.

The process 300 determines second domains hosting the image based on the domain data (308). For example, the link determination apparatus 122 accesses the domain data store 114 and determines the second domain hosting each of the images linked to by the image links from the web pages hosted on first domains, e.g., as determined in process 306.

The second domains can be the same or different second domains. For example, a web page hosted on the first domain 252 has an image link linking to an image of Starry Night hosted on the second domain 252-1 and a web page hosted on the first domain 254 has an image link linking to an image of Starry Night hosted on the second domain 254-179. The Starry Night images hosted on the second domains 252-1 and 254-179 can be the same image of a Starry Night or they can be different images of a Starry Night, e.g., the two images can be copies of the same data file or can both be pictures of the original painting but taken from different perspectives. As such, the link determination apparatus 122 determines that the second domains 252-1 and 254-179 are second domains hosting the image.

The process 300 compares the codomain relationship measures for codomains pairs (310). A codomain pair is a unique pairing of one of the determined second domains with one of the respective first domains. For example, a first codomain pair is the first domain 252 and the second domain 252-1, and a second codomain pair is the first domain 254 and the second domain 254-179. Although only two codomain pairs are described in the preceding example, in some scenarios there can be many more codomain pairs and the codomain measure determination apparatus 124 compares the codomain relationship measure of each codomain pair to that of each other codomain pair.

In some implementations, the codomain measure determination apparatus 124 compares the codomain relationship measures determined in process 210, e.g., based on Equation 1 or Equation 2. For example, the codomain measure determination apparatus 124 compares the codomain relationship measure for the first codomain pair of the first domain 252 and the second domain 252-1 of 0.987 with the codomain relationship measure of the second codomain pair of the first domain 254 and the second domain 254-179 of 0.007.

The process 300 selects one of the plurality of web pages to be referenced by the search result based on the comparison (312). For example, the search system 110 selects one of the multiple web pages hosted on the first domains to be referenced by the search result. In some implementations, the search system 110 selects the web page hosted by the first domain from the codomain pair that has the highest codomain relationship measure. The highest codomain relationship measure indicates the codomain pair with the highest degree of relatedness. For example, the search system 110 selects the first codomain pair of the first domain 252 and the second domain 252-1 as its codomain relationship measure is higher than that of the second codomain pair of the first domain 254 and the second domain 254-179.

User selection of the search result causes, for example, the image to be retrieved from the second domain of the codomain pair having the first domain that hosts the selected web page and displayed on the selected web page. With reference to the above example, the search system 110 determines that the first codomain pair of the first domain 252 and the second domain 252-1 has the highest codomain relationship measure, e.g., based on the comparison by process 310, and, in turn, selects the web page hosted by the first domain 252 to reference in the search result. User selection of the search result causes the user device 106 to render the selected web page, which causes the user device 106 to retrieve the image hosted by second domain 252-1 for display on the selected web page.

In some scenarios, two or more web pages hosted by the same first domain and each having an image link to an image hosted by the same second domain may be included in the multiple web pages identified by the search system 110 as being web pages from which an image responsive to the search query is accessible. In such scenarios, as the respective codomain relationship measures will be the same for the two or more web pages on a domain level basis, the search system 110 can select one of the two or more web pages based on other factors such as, for example, the relevancy of the web page to the search query or the quality of the web page. For example, the search system can access relevancy and quality metrics from a relevancy and quality data store and base the selection on this accessed relevancy and quality data.

Further, in additional to utilizing this relevancy and quality of the web pages to the search query to arbitrate between web pages hosted by the same first domain, such data can also generally be considered in the selection of a web page in the process 312. In some implementations, the search system 110 uses the relevancy metrics, quality metrics or both of the multiple web pages, in combination with the codomain relationship measures to select the web page to be referenced in the search result. For example, the search system 110 weights the relevancy score for each of the multiple web pages, the quality score for each of the multiple web pages and the codomain relationship measure associated with each of the multiple web pages. The search system 110 then aggregates the weighted scores for the web pages and selects the web page with the highest aggregated score. In some implementations, the weights for the relevancy score, the quality score and the codomain relationship score can be set by a system administrator, e.g., 0.2 weight for the relevancy score, 0.2 weight for the quality score and 0.6 weight for the codomain relationship measure. The search system 110 can, for example, multiply the weights with the respective scores/measure and sum the result to determine the aggregated and weighted score for each web page.

The above description describes determining codomain relationship scores on a domain level basis and selecting web pages to be referenced in a search result based on this domain level, codomain relationship measure. However, the techniques and processes described herein can also be applied on a subdomain level. For example, the process 204 can determine the total number of image links on web pages hosted on subdomain levels of the first domains and the process 206 can identify the second domains, on subdomain levels, hosting images to which image links on web pages hosted on particular subdomains of the first domains link. Likewise, the process 210 can determine codomain relationship measures for codomain pairs having one of the subdomains from the first domains and one of the subdomains from the second domains.

For convenience, the above description describes the processes in terms of web page resources, however, the techniques and processes described herein are applicable to other types of resources 105, for example, word processing documents, PDFs, images, videos, and the like.

Additional Implementation Details

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA, field programmable gate array, or an ASIC, application specific integrated circuit. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer.

Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

Figure 4:
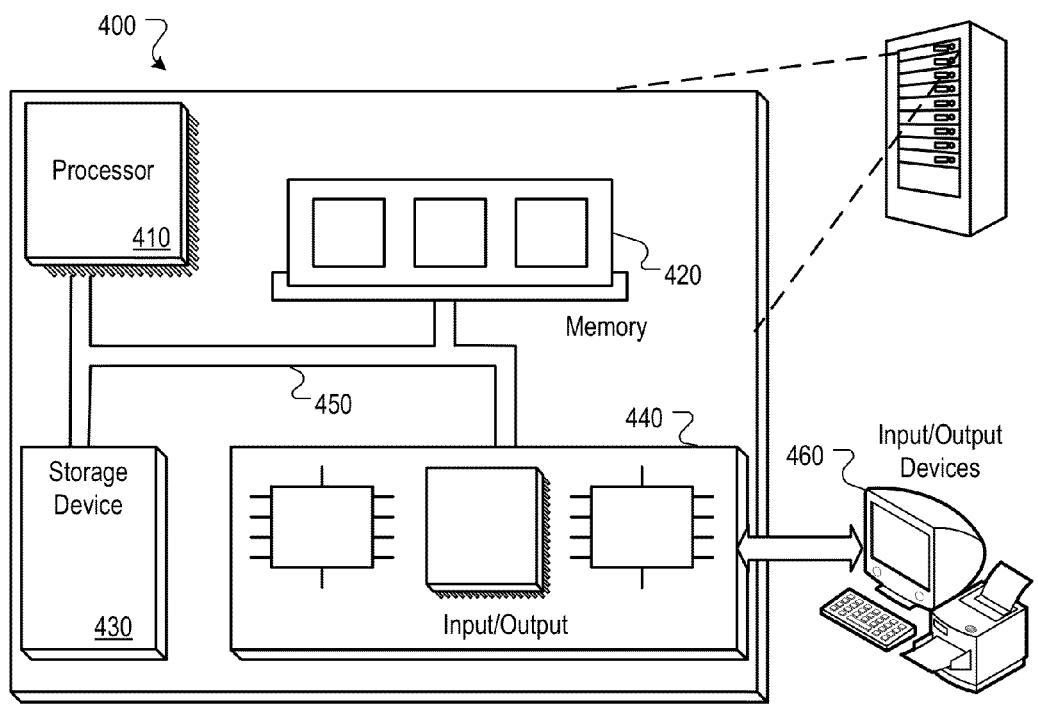
FIG. 4 is a block diagram of an example programmable processing system.

An example of one such type of computer is shown in FIG. 4, which is a block diagram of an example programmable processing system ("system"). The system 400 that can be utilized to implement the systems and methods described herein. The architecture of the system 400 can, for example, be used to implement a computer client, a computer server, or some other computer device.

The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 460.

While this specification contains many specific implementation details, these should not be construed as limitations on the scope of any implementations or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   accessing domain data specifying first domains that are used to host web pages and second domains that are used to host images linked to by the web pages;
   for each of the first domains:
      determining a total number of image links on web pages hosted on the first domain, wherein each image link is a link to an image hosted on a second domain;
      identifying second domains hosting images to which image links on web pages hosted on the first domain link;
      for each of the second domains:
         determining a number of image links from web pages hosted on the first domain linking to images hosted on the second domain; and
         determining, by one or more data processors, a codomain relationship measure for the first domain and the second domain specifying a measure of relatedness between the first domain and the second domain based at least in part on the number of image links from web pages hosted on the first domain linking to images hosted on the second domain and the total number of image links on web pages hosted on the first domain.

2. The method of claim 1, further comprising:
   receiving data specifying a search query;
   determining a search result responsive to the search query, the search result comprising a reference to an image, wherein the image is referenced by a plurality of web pages;
   determining respective first domains, each respective first domain hosting one of the plurality of web pages;
   determining second domains hosting the image based on the domain data;
   comparing the codomain relationship measures for codomains pairs, wherein each of the codomain pairs is a unique pairing of one of the determined second domain with one of the respective first domains; and
   selecting one of the plurality of web pages to be referenced by the search result based at least in part on the comparison.

3. The method of claim 2, wherein the first domain of the selected one of the plurality of web pages is a domain different from the determined second domain.

4. The method of claim 2, further comprising:
   accessing quality data specifying a quality measure of each of the plurality of web pages; and
   wherein selecting one of the plurality of web pages to be referenced by the search result based on the comparison comprises selecting one of the plurality of web pages to be referenced by the search result based at least in part on the comparison and the quality measures.

5. The method of claim 1, wherein the codomain relationship measure is a ratio of the number of image links from web pages hosted on the first domain linking to images on the second domain to the total number of image links on web pages hosted on the first domain.

6. The method of claim 1, further comprising:
   determining that the total number of image links hosted on web pages on the first domain exceeds an image link number threshold; and
   wherein determining a codomain relationship measure comprises determining the codomain relationship measure only in response to determining that the total number of image links on web pages hosted on the first domain exceeds the image number threshold.

7. A system comprising:
   one or more data processors; and
   instructions stored on a computer readable storage medium that when executed by the one or more data processors cause the one or more data processors to perform operations comprising:
   accessing domain data specifying first domains that are used to host web pages and second domains that are used to host images linked to by the web pages;
   for each of the first domains:
      determining a total number of image links on web pages hosted on the first domain, wherein each image link is a link to an image hosted on a second domain;
      identifying second domains hosting images to which image links on web pages hosted on the first domain link;
      for each of the second domains:
         determining a number of image links from web pages hosted on the first domain linking to images hosted on the second domain; and
         determining, by one or more data processors, a codomain relationship measure for the first domain and the second domain specifying a measure of relatedness between the first domain and the second domain based at least in part on the number of image links from web pages hosted on the first domain linking to images hosted on the second domain and the total number of image links on web pages hosted on the first domain.

8. The system of claim 7, wherein the instructions when executed by the one or more data processors cause the one or more data processors to further perform operations comprising:
   receiving data specifying a search query;
   determining a search result responsive to the search query, the search result comprising a reference to an image, wherein the image is referenced by a plurality of web pages;
   determining respective first domains, each respective first domain hosting one of the plurality of web pages;
   determining second domains hosting the image based on the domain data;
   comparing the codomain relationship measures for codomains pairs, wherein each of the codomain pairs is a unique pairing of one of the determined second domain with one of the respective first domains; and selecting one of the plurality of web pages to be referenced by the search result based at least in part on the comparison.

9. The system of claim 8, wherein the first domain of the selected one of the plurality of web pages is a domain different from the determined second domain.

10. The system of claim 8, wherein the instructions when executed by the one or more data processors cause the one or more data processors to further perform operations comprising:

accessing quality data specifying a quality measure of each of the plurality of web pages; and wherein selecting one of the plurality of web pages to be referenced by the search result based on the comparison comprises selecting one of the plurality of web pages to be referenced by the search result based at least in part on the comparison and the quality measures.

11. The system of claim 7, wherein the codomain relationship measure is a ratio of the number of image links from web pages hosted on the first domain linking to images on the second domain to the total number of image links on web pages hosted on the first domain.

12. The system of claim 7, wherein the instructions when executed by the one or more data processors cause the one or more data processors to further perform operations comprising:

determining that the total number of image links hosted on web pages on the first domain exceeds an image link number threshold; and wherein determining a codomain relationship measure comprises determining the codomain relationship measure only in response to determining that the total number of image links on web pages hosted on the first domain exceeds the image number threshold.

13. A computer-readable storage medium having instructions stored thereon, which, when executed by one or more data processors, causes the one or more data processors to perform operations comprising:

accessing domain data specifying first domains that are used to host web pages and second domains that are used to host images linked to by the web pages;

for each of the first domains:
  determining a total number of image links on web pages hosted on the first domain, wherein each image link is a link to an image hosted on a second domain;
  identifying second domains hosting images to which image links on web pages hosted on the first domain link;
  for each of the second domains:
    determining a number of image links from web pages hosted on the first domain linking to images hosted on the second domain; and
    determining, by one or more data processors, a codomain relationship measure for the first domain and the second domain specifying a measure of relatedness between the first domain and the second domain based at least in part on the number of image links from web pages hosted on the first domain linking to images hosted on the second domain and the total number of image links on web pages hosted on the first domain.

14. The computer-readable storage medium of claim 13, wherein the instructions when executed by the one or more data processors cause the one or more data processors to further perform operations comprising:

receiving data specifying a search query;

determining a search result responsive to the search query, the search result comprising a reference to an image, wherein the image is referenced by a plurality of web pages;

determining respective first domains, each respective first domain hosting one of the plurality of web pages;

determining second domains hosting the image based on the domain data;

comparing the codomain relationship measures for codomains pairs, wherein each of the codomain pairs is a unique pairing of one of the determined second domain with one of the respective first domains; and selecting one of the plurality of web pages to be referenced by the search result based at least in part on the comparison.

15. The computer-readable storage medium of claim 14, wherein the first domain of the selected one of the plurality of web pages is a domain different from the determined second domain.

16. The computer-readable storage medium of claim 14, wherein the instructions when executed by the one or more data processors cause the one or more data processors to further perform operations comprising:

accessing quality data specifying a quality measure of each of the plurality of web pages; and wherein selecting one of the plurality of web pages to be referenced by the search result based on the comparison comprises selecting one of the plurality of web pages to be referenced by the search result based at least in part on the comparison and the quality measures.

17. The computer-readable storage medium of claim 13, wherein the codomain relationship measure is a ratio of the number of image links from web pages hosted on the first domain linking to images on the second domain to the total number of image links on web pages hosted on the first domain.

18. A computer-implemented method, comprising:

accessing domain data specifying first domains that are used to host web pages and second domains that are used to host images linked to by the web pages;

for each of the first domains:
  identifying second domains hosting images to which image links on web pages hosted on the first domain link;
  for each of the second domains:
    determining a total number of image links linking to images hosted on the second domain;
    determining a first number of image links from web pages hosted on the first domain linking to images hosted on the second domain, wherein the total number of image links is an aggregation of the first number of image links and a second number of image links from web pages hosted on domains, other than the first domain, linking to images hosted on the second domain; and
    determining, by one or more data processors, a codomain relationship measure for the first domain and the second domain specifying a measure of relatedness between the first domain and the second domain based at least in part on the first number of image links and the total number of image links.

19. The method of claim 18, wherein the codomain relationship measure is a ratio of the first number of image links to the total number of image links.

20. The method of claim 18, further comprising:

for each of the first domains:

determining a second number of image links on web pages hosted on the first domain, wherein each image link is a link to an image hosted on a second domain; and wherein determining the codomain relationship measure for the first domain and the second domain comprises determining the codomain relationship measure based at least in part on the first number of image links, the total number of image links and the second number of image links.

* * * * *

UNITED STATES PATENT AND TRADEMARK OFFICE
CERTIFICATE OF CORRECTION

| | | |
|---|---|---|
| PATENT NO. | : 8,943,099 B1 | Page 1 of 1 |
| APPLICATION NO. | : 13/774448 | |
| DATED | : January 27, 2015 | |
| INVENTOR(S) | : Sarkar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 142 days.

Signed and Sealed this
Eighth Day of September, 2015

Michelle K. Lee
*Director of the United States Patent and Trademark Office*